United States Patent [19]

Kara

[11] Patent Number: 5,825,893
[45] Date of Patent: Oct. 20, 1998

[54] SYSTEM AND METHOD FOR REGISTGRATION USING INDICIA

[75] Inventor: Salim G. Kara, Houston, Tex.

[73] Assignee: E-Stamp Corporation, Houston, Tex.

[21] Appl. No.: 797,884

[22] Filed: Feb. 10, 1997

Related U.S. Application Data

[60] Division of Ser. No. 480,305, Jun. 7, 1995, Pat. No. 5,666,284, which is a continuation-in-part of Ser. No. 263,751, Jun. 22, 1994, Pat. No. 5,606,507, which is a continuation-in-part of Ser. No. 176,716, Jan. 3, 1994, Pat. No. 5,510,992.

[51] Int. Cl.⁶ .................................................. H04L 9/00
[52] U.S. Cl. .................................. 380/51; 380/9; 380/23; 380/25; 380/49; 380/50; 380/55; 705/401; 705/405; 705/408
[58] Field of Search .................. 380/4, 9, 23, 24, 380/25, 49, 50, 51, 55, 59; 705/401, 405, 408

[56] References Cited

U.S. PATENT DOCUMENTS

| | | | |
|---|---|---|---|
| 4,641,347 | 2/1987 | Clark et al. | 380/3 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,760,532 | 7/1988 | Sansone et al. . | |
| 4,763,271 | 8/1988 | Field . | |
| 4,775,246 | 10/1988 | Edelmann et al. | 380/23 |
| 4,800,506 | 1/1989 | Axelrod et al. . | |
| 4,802,218 | 1/1989 | Wright et al. | 380/23 |
| 4,812,994 | 3/1989 | Taylor et al. . | |
| 4,831,555 | 5/1989 | Sandone et al. . | |
| 4,864,618 | 9/1989 | Wright et al. | 380/51 |
| 4,868,757 | 9/1989 | Gil . | |
| 4,900,903 | 2/1990 | Wright et al. | 235/380 |
| 4,900,904 | 2/1990 | Wright et al. | 235/381 |
| 4,901,241 | 2/1990 | Schneck | 364/464.02 |
| 5,025,141 | 6/1991 | Bolan | 235/472 |
| 5,065,000 | 11/1991 | Pusic | 235/381 |
| 5,091,771 | 2/1992 | Bolan et al. | 357/74 |
| 5,111,030 | 5/1992 | Brasington et al. | 235/375 |
| 5,239,168 | 8/1993 | Durst, Jr. et al. | 235/432 |
| 5,490,216 | 2/1996 | Richardson, III | 380/4 |
| 5,510,992 | 4/1996 | Kara . | |
| 5,534,857 | 7/1996 | Laing et al. | 340/825.34 |
| 5,535,407 | 7/1996 | Yanagawa et al. . | |
| 5,544,246 | 8/1996 | Mandelbaum et al. | 380/23 |
| 5,563,395 | 10/1996 | Hoshino | 235/380 |

FOREIGN PATENT DOCUMENTS

| | | |
|---|---|---|
| 0137737 | 4/1985 | European Pat. Off. . |
| 2580844 | 10/1986 | France . |
| 2251210 | 7/1992 | United Kingdom . |
| 8801818 | 3/1988 | WIPO . |

OTHER PUBLICATIONS

Dallas Semiconductor, News Release, "Miniature, Coin-Shaped Chip is Read or Written with a Touch," Jul. 21, 1991, pp. 1–7.

*Primary Examiner*—Bernarr Earl Gregory
*Attorney, Agent, or Firm*—Fulbright & Jaworski L.L.P.

[57] ABSTRACT

A system and method for registering a software license agreement utilizing user information encoded in a machine readable media is disclosed. A user installs a software program onto a processor-based system. Thereafter, the user provides user-specific information to the program which is encrypted in a machine-readable form. This encrypted user information is then sent to a owner of rights in the software program to be included in a database of registered software users.

42 Claims, 11 Drawing Sheets

"E-Stamp"™ – Registration form

31 — T.M.U. Button Serial #000000001   Date: April 20, 1994  ⎫
32 — E-Stamp Serial   #000000001   Time: 01:29 AM       ⎬ 33
                                                        ⎭

35 {
Registered user:
Individual     Salim G. Kara          Social Security # 636-18-0137
Organization   Global Impex, Inc.     Employer I.N. # 76-0422781
Address:       505 Cypress Station Dr.
               Suite #505
City:          Houston     State: Tx    Zipcode+4: 77090-1612
Telephone: (713)583-8909   Fax: (713)699-0101
}

Post N Mail License Agreement

38 {
This is a legal agreement between you (an individual or an entity), the end user, and Post N Mail, Inc. If you do not agree to the terms of this Agreement, promptly return the disk package and accompanying items (including all hardware, written materials and binders or other containers) to the place you obtained them for a full refund.
License
1. Grant of License.
2. Term of License.
3. Copyright.
4. Other restrictions.
5. Limited warranty.
6. Customer remedies.
7. No Other Warranties.
8. No Liability for Consequential Damages.
}

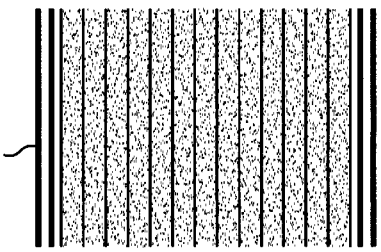

Quit  Options  Help

E-Stamp  Post  Mail

TMU Serial # 2 128 176 32 0 0 0 175  E-Stamp MAKER Serial # / Zip 77014-9998-44 Post ID #
ID       Info 404          409  Initialize         410  Write ID1  [ ]  BClinton
          Password
          8 Bytes
          PNM password
          403                405

10 45 12 15 93 77 0 14 99 98 44 110 151 65 2
          244 45 75 194 86 97 218 211 46 250 237 69 28 167 196
          100 11 53 72 141 182 5 167 64 106 190 63 119 13 63
          1st 2 Bytes=Time, next 3 Bytes = Date, next 6 Bytes = Post Office ID #
          4 Bytes = E-Stamp Maker Ser#, Balance 30 Bytes = Random #

ID2  [ ]  193 240 33
          94 85 131 83
          195
          407

48 10 94 101 57 55 67 187 108 65 117 111 179 125
          205 132 90 24 146 186 112 240 247 2 Random # = 24 Bytes
          Usage Analysis = 14 Bytes
          Strike Counter-Descend.= 3 Bytes (start 2,500,000)
          $ Counter-    Descend.= 4 Bytes (start $2,500,000.00)
          406

ID3  [ ]  48 104 213
          171 225 178
          27 68
          401

$500.00 Amount $ input/balance = 4 Bytes (Max. $25,000.0000)
          User Zip = 5 Bytes              Soc. Security # / EIN # = 10 Bytes (20 digits)
          Strike Counter- Ascend.= 3 Bytes  PNM Registration # = 4 Bytes
          $ Counter-    Ascend.= 4 Bytes  Expiry date       = 3 Bytes
          Postage original amount= 3 Bytes
          408

TMU Verification  PNM Registration #000000001    Expiry date: 12-31-95
Postage original: $500.00                        "E-Stamp" serial #000000001
Postage balance: $  6.72    Time: 3:18p.m. Date: 10-30-93 By: 77090-2765-65
COUNTERS CHECK: 1. $ Ascend.+Descend. = $2,500,000.00  2. Strikes, Ascend.+Descend. = 2,500,000

Usage Analysis Log

Total Usage = $493.28
A) $.01 to $.29= 991   B) $.30 to $.40= 166   C) $.41 to $.45= 122   D) $.46 to $.99= 0
E) $1.00 to $1.99= 14  F) $2.00 to $3.00= 0   G) Over 3.00= 16

40
402
Post N Mail, Inc

FIG. 4B

Quit  Options  Help
| E-Stamp   Post   Mail |

TMU Serial # 2 128 176 32 0 0 0 175  E-Stamp MAKER Serial # / Zip 77014-9998-44 Post ID #
ID         Password  403          Info 404       409  [Initialize]   410  [Write]

ID1  [BClinton]
     8 Bytes
     PNM password
                    405

10  45  12  15  93  77   0  14  99  98  44  110 151  65   2
     244 45  75 194  86  97 218 211  46 250 237  69  28 167 196
     100 11  53  72 141 182   5 167  64 106 190  63 119  13  63
     1st 2 Bytes=Time, next 3 Bytes = Date, next 6 Bytes = Post Office ID #
     4 Bytes = E-Stamp Maker Ser#, Balance 30 Bytes = Random #

ID2  193 240 33
     94 85 131 83
     195
                    407      406
     48  10  94 101  57  55  67 187 108  65 117 111 179 125
     205 132  90  24 146 186 112 240 247   2 Random # = 24 Bytes
     Usage Analysis = 14 Bytes
     Strike Counter-Descend.= 3 Bytes (start 2,500,000)
     $ Counter-    Descend.= 4 Bytes (start $2,500,000.00)

ID3  48 104 213
     171 225 178
     27 68
                    408
     $500.00 Amount $ input/balance = 4 Bytes (Max. $25,000.0000)
     User Zip = 5 Bytes              Soc. Security # / EIN # = 10 Bytes (20 digits)
     Strike Counter- Ascend.= 3 Bytes   PNM Registration #   = 4 Bytes
     $ Counter-      Ascend.= 4 Bytes   Expiry date          = 3 Bytes
     Postage original amount = 3 Bytes 411
                                                    Expiry date: 12-31-95
TMU Verification  PNM Registration #000000001 "E-Stamp" serial #000000001
Time: 10:45am Date: 12-15-93 By: 77014-9998-44
COUNTERS CHECK: 1. $ Ascend.+Descend. = $2,500,000.00  2. Strikes, Ascend.+Descend. = 2,500,000

Postage original: $506.72
Postage balance: $506.72                                                          412

Usage Analysis Log
Total Usage = $ 0.00
A) $.01 to $.29=  0     B) $.30 to $.40=  0     C) $.41 to $.45=  0     D) $.46 to $.99=  0
E) $1.00 to $1.99= 0    F) $2.00 to $3.00= 0    G) Over 3.00=  0

Level 1: Password.

BCLINTON

Level 2: Algorithm 1.

$p1 = (d1 + d4 + d7 + d10 + d13 + d16) \mod 256$
$p2 = (d2 + d5 + d8 + d11 + d14 + d17) \mod 256$
$p3 = (d3 + d6 + d9 + d12 + d15 + d18) \mod 256$
$p4 = (d19 + d22 + d25 + d28 + d31 + d34) \mod 256$
$p5 = (d20 + d23 + d26 + d29 + d32 + d35) \mod 256$
$p6 = (d21 + d24 + d27 + d30 + d33 + d36) \mod 256$
$p7 = (d37 + d38 + d39 + d40 + d41 + d42) \mod 256$
$p8 = (d43 + d44 + d45) \mod 256$ Level 3: Algorithm 2.

$p1 = d1 \mod 256$
$p2 = (d2 + d3) \mod 256$
$p3 = (d4 + d5 + d6) \mod 256$
$p4 = (d7 + d8 + d9 + d10) \mod 256$
$p5 = (d11 + d12 + d13 + d14 + d15) \mod 256$
$p6 = (d16 + d17 + d18 + d19 + d20 + d21) \mod 256$
$p7 = (d22 + d23 + d24 + d25 + d26 + d27 + d28) \mod 256$
$p8 = (d29 + d30 + d31 + d32 + d33 + d34 + d35 + d36 + d37 + d38 + d39 + d40 + d41 + d42 + d43 + d44 + d45) \mod 256$

*FIG. 6*

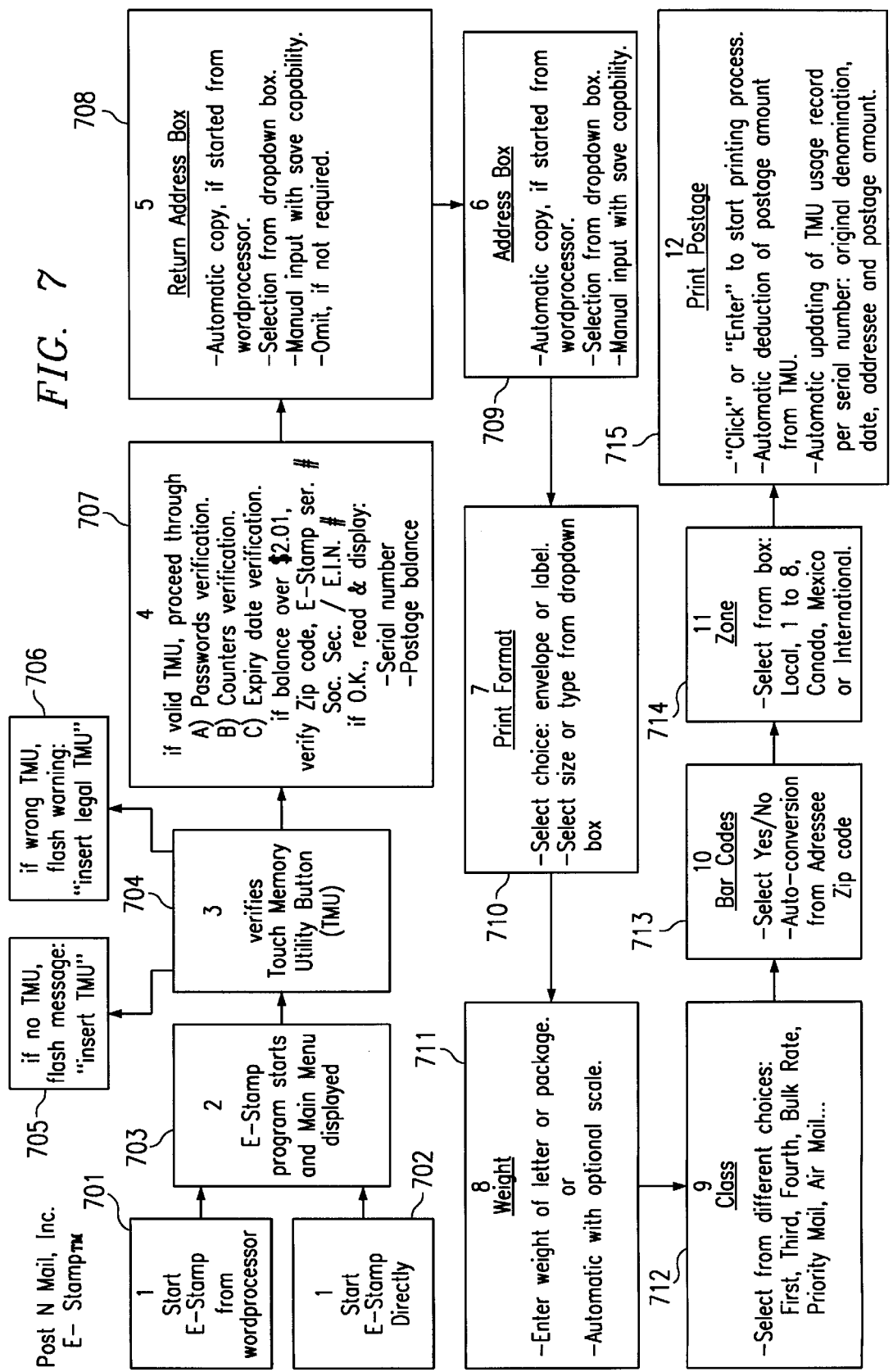

FIG. 8

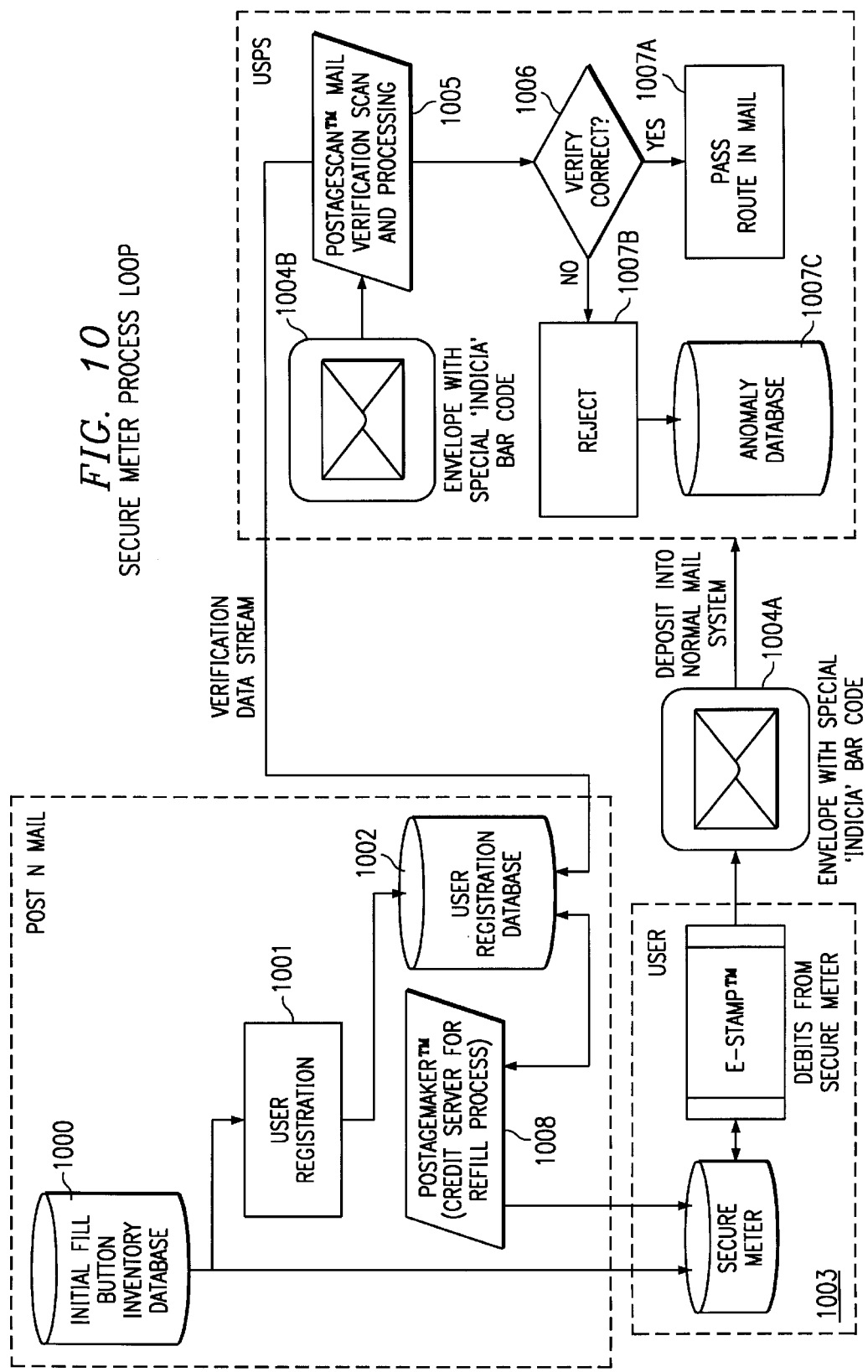

SYSTEM AND METHOD FOR REGISTGRATION USING INDICIA

REFERENCE TO RELATED APPLICATIONS

The present application is a divisional application of pending Application Ser. No. 08/480,305, entitled "SYSTEM AND METHOD FOR STORING, RETRIEVING AND AUTOMATICALLY PRINTING POSTAGE ON MAIL," filed Jun. 7, 1995, now U.S. Pat. No. 5,666,284, itself a continuation-in-part application of Application Ser. No. 08/263,751, entitled "SYSTEM AND METHOD FOR STORING, RETRIEVING AND AUTOMATICALLY PRINTING POSTAGE ON MAIL," filed Jun. 22, 1994, now U.S. Pat. No. 5,606,507, which in turn is a continuation-in-part application of Application Ser. No. 08/176,716, entitled "SYSTEM AND METHOD FOR AUTOMATICALLY PRINTING POSTAGE ON MAIL," filed Jan. 3, 1994, now issued as U. S. Pat. No. 5,510,992.

TECHNICAL FIELD OF THE INVENTION

This invention relates, in general to a portable postage storage device that can be coupled to processor-based systems to receive and retrieve an amount of authorized postage. More specifically, the invention relates to a system and method for a user to automatically calculate the necessary postage for an item of mail and print a postage meter stamp for the calculated amount, along with other encrypted information, on a piece of mail or postage label under the control of a word processing program.

BACKGROUND OF THE INVENTION

Presently, it is common for individuals or businesses to have residing within their offices a postage meter rented from a commercial business such, for example, Pitney Bowes. This arrangement is very convenient, since letters may be addressed, postage applied, and mailed directly from the office without requiring an employee to physically visit the U.S. Post Office and wait in line in order to apply postage to what is often a quite significant volume of outgoing mail, or to manually apply stamps to each piece of mail in which case mail is slower because it has to go through a postage cancelling machine.

Quite naturally, postage meters were developed to relieve the manual application of stamps on mail and to automate the above process. Nevertheless, a postage meter residing within an office is not all that convenient and efficient as it may first seem to be. First, a postage meter may not be purchased, but must be rented. The rental fees alone are typically over twenty dollars per month. For a small business, this can be quite an expense to incur year after year. Second, a postage meter must be adjusted, serviced and replenished manually; e.g., each day the date must be adjusted manually, periodically the stamp pad must be re-inked, and when the amount of postage programmed within the postage meter has expired the postage in the meter must be replenished. To be replenished, a postage meter must be manually unplugged, placed into a special case (the meter is of a significant weight), and an employee must visit a U.S. Post Office to have the meter reprogrammed with additional postage. Upon arrival at the U.S. Post Office, a teller must cut the seal, replenish the meter with a desired amount of postage, and reseal the meter before returning it to the employee. The meter must then be returned to the office and powered up.

A slightly more expensive meter (rental of approximately $30.00 more) works in the following manner: 1) a user sets up an account with Pitney Bowes, 2) 7 to 10 days before a user requires any postage, the user deposits with the meter owner the amount of postage required, 3) the user then calls the owner (7 to 10 days later) and they issue instructions as to the manual pushing of a variety of buttons on the meter (programming) which will replenish the postage amount on the meter. Nonetheless, the meter must be taken to the post office every 6 months.

Thus, in addition to the monthly rent, the servicing and replenishing of the meter requires the time and expense of at least one employee to take the meter to the U.S. Post Office to have it replenished. Of course, this procedure results in down-time wherein the postage meter is not available to the business for the application of postage to outgoing mail. In addition, because of the monthly rent and the size of these devices, it is generally not practical for businesses to have more than one postage meter to alleviate this down-time.

As previously mentioned, the alternative to a business, especially a small business, is to forego the advantages of a postage meter and to buy sheets, or books, of stamps. Without a doubt, this is not a sufficient solution. Since a variety of denominations of stamps are generally required, applying two 29¢ stamps to a letter requiring only 40¢, will begin to add up over time. Additionally, it is difficult for a business to keep track of stamp inventories and stamps are subject to pilferage and degeneration from faulty handling. Moreover, increases in the postal rate (which seem to occur every three years) and the requirement for variable amounts of postage for international mail, makes the purchase of stamps even more inefficient and uneconomical.

Because of different postage zones, different classes of mail, different postage required by international mail and the inefficiency of maintaining stamps within an office, it is important to have an automatic postage system, such as the aforementioned inefficient and relatively expensive postage meter. Accordingly, there is a need in the art for a system and method that provides the automatic placement of postage on mail at locations other than a U.S. Post Office, while not requiring the use of a traditional postage meter.

SUMMARY OF THE INVENTION

Thus, it is a primary object of the present invention to provide a system and method for automatically providing for the placement of postage on mail outside of the environment of the U.S. Post Office, without requiring the use of a conventional postage meter.

In the attainment of the primary object, the present invention is embodied within a processor-based system located at a business' offices. A means is provided for purchasing a desired amount of postage at a U.S. Post Office and for storing this purchased amount within a postage storage device. Thereafter, a user may invoke the processor-based system to access the postage storage device and retrieve a portion of the stored amount of postage for subsequent printing on an envelope, a label, or a letter via a printer coupled to the processor-based system in a form similar to that employed by a conventional postage meter.

In a preferred embodiment of the present invention, the processor-based system is a personal computer ("PC") located within a business' office. The PC will store a program, hereinafter referred to as the "E-STAMP" program, which requests input from the user on the amount of desired postage and subsequently prints on an envelope, a letter or a label through a printer, or a special purpose label-maker, coupled to the PC the desired amount of postage. The desired amount of postage is printed as a meter stamp and may contain encrypted information for security purposes. The E-STAMP program interfaces with the user through the display screen and the keyboard, or mouse, of the PC.

In another preferred embodiment of the present invention, a touch memory utility ("TMU") button, manufactured by, for example, Dallas Semiconductor, Dallas, Tex., is utilized for transferring the purchased amount of postage from the U.S. Post Office to the processor based system at the user's office. Typically, a user will physically take the TMU button to (or purchase from) a U.S. Post Office location, that post office having a system complementary to the one installed on the customer's PC. A postal worker will interface the TMU button with the system residing at the post office in order to replenish the amount of postage programmed within the button in an amount requested and purchased by the customer. The user may also call a number (post office) and have the post office transfer the required amount of postage by modem. The post office may also elect to sell disposable TMU buttons pre-loaded in various denominations.

The customer will then physically carry the button back to the processor-based system, couple the button to a corresponding receiving apparatus coupled to the processor-based system so that portions of the stored postage may be downloaded to the E-STAMP program upon a request by the customer. Upon invocation of the E-STAMP program by the customer, the program will inform the customer of the newly obtained amount of postage via the display screen.

In yet another preferred embodiment of the present invention, the display screen coupled to the processor-based system employs a "windows" type display for interfacing with the user. Through the display screen, the E-STAMP program will request a password from the user and the amount of postage the user wishes to apply to a piece of outgoing mail or corresponding label for subsequent application to a package or envelope. The user will enter the desired amount of postage, the program will retrieve this postage stored within the TMU button, and the E-STAMP program will print a meter stamp through a coupled printing device onto the outgoing mail or label.

In still yet another preferred embodiment of the present invention, the E-STAMP program may be coupled to a word processing program residing within the processor-based system. As a result, the application of the meter stamp may be made in conjunction with the word processing program, which has the capability to print envelopes, separately or in conjunction with the printing of a corresponding letter produced by the word processing program.

Furthermore, the E-STAMP program may also be programmed to print the address, return address and meter stamp on correspondence. This correspondence can then be placed in envelopes with cutouts or glassine paper at the appropriate areas so that the address, return address and/or meter stamp can be visualized through the envelope.

In another preferred embodiment of the present invention, the aforementioned TMU buttons are specially manufactured by Dallas Semiconductor for use in conjunction with E-STAMP programs, i.e., unique serial numbers specific to the E-STAMP program are embedded within each TMU button. These serial numbers are then provided to the U.S. post office for programming into their corresponding E-STAMP MAKER program and system. Thus, a form of security is provided since only the TMU buttons specially manufactured for use with the E-STAMP program are able to receive or retrieve data pertaining to postage amounts, as previously described.

Additionally, a special password could be dedicated for use with the E-STAMP program so that access is only provided to users entering the correct password. As a result of the aforementioned, the U.S. Post Office can be assured that only authorized users are able to obtain postage replenishment, and that users are unable to replenish their postage within the E-STAMP program or the TMU button without cooperation from the U.S. Post Office. The aforementioned serial numbers and passwords may also allow a user and the U.S. Post Office to track postage used by every company, department, employee, etc. Furthermore, other software programs may also be configured to access the E-STAMP program so that spread sheets and/or graphs may be produced providing statistics on postage use within a business.

Furthermore, the E-STAMP program can be used to encode a variety of information within the postage meter stamp using symbol technology. Such information would be machine readable and can be used to identify meter stamp forgeries.

In an alternative embodiment of the present invention, the E-STAMP program is able to automatically calculate the correct postage to place on a letter, parcel or label as a function of the class, zone and weight of the particular item to be mailed. One embodiment of the present invention includes a balance coupled to the processor-based system so that mail can be placed on the balance and the weight of the mail automatically entered into the E-STAMP program for calculating the correct postage for that mail.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates an embodiment of a user registration form;

FIGS. 4A–4B illustrates a display screen utilized by the present invention to interface with a U.S. Post Office employee when replenishing postage within the present invention;

FIG. 6 illustrates a preferred embodiment of the security techniques utilized within the present invention;

FIG. 7 illustrates a flow diagram of the operation of the present invention within a processor-based system;

FIG. 8 illustrates a display interface provided to a user when accessing the present invention on a processor-based system;

FIG. 10 shows the interrelationship of the data base for registering memories assigned to users and the use of the data base for verification purposes.

DETAILED DESCRIPTION OF THE INVENTION

The present invention provides for a portable postage storage device, described in more detail below, that can be coupled to a processor-based system at both the customer's site and at the U.S. Post Office. Throughout the remainder of this description, reference is made to the U.S. Post Office. Note, however, that the present invention may be implemented within any country and with respect to any postal system.

The present invention will allow an individual to purchase a desired amount of postage at a U.S. Post Office, such postage being stored within a postage storage device. The user may then invoke a processor-based system to access and retrieve a portion of the stored amount of postage via a program stored on a processor-based system, such program hereinafter referred to as the "E-STAMP" program. The E-STAMP program requests input from the user on the weight of the item to be mailed, the addressee's address, etc. The E-STAMP program will utilize the information that was entered to calculate the amount of desired postage for an item to be mailed and print a meter stamp on an envelope, label or letter through a printer or special purpose label maker coupled to the processor-based system.

The postage storage device can also be coupled to a processor-based system located at the U.S. Post Office. Particular post office sites will have installed a system complimentary to the E-STAMP system installed on the customer's PC. The program installed at the U.S. Post Office, hereinafter referred to as the "E-STAMP MAKER" will allow a postal worker to interface the postage storage device with the processor-base system residing at the post office in order to replenish the amount of postage programmed within the postage storage device in an amount requested and purchased by the customer.

Figure 1A:
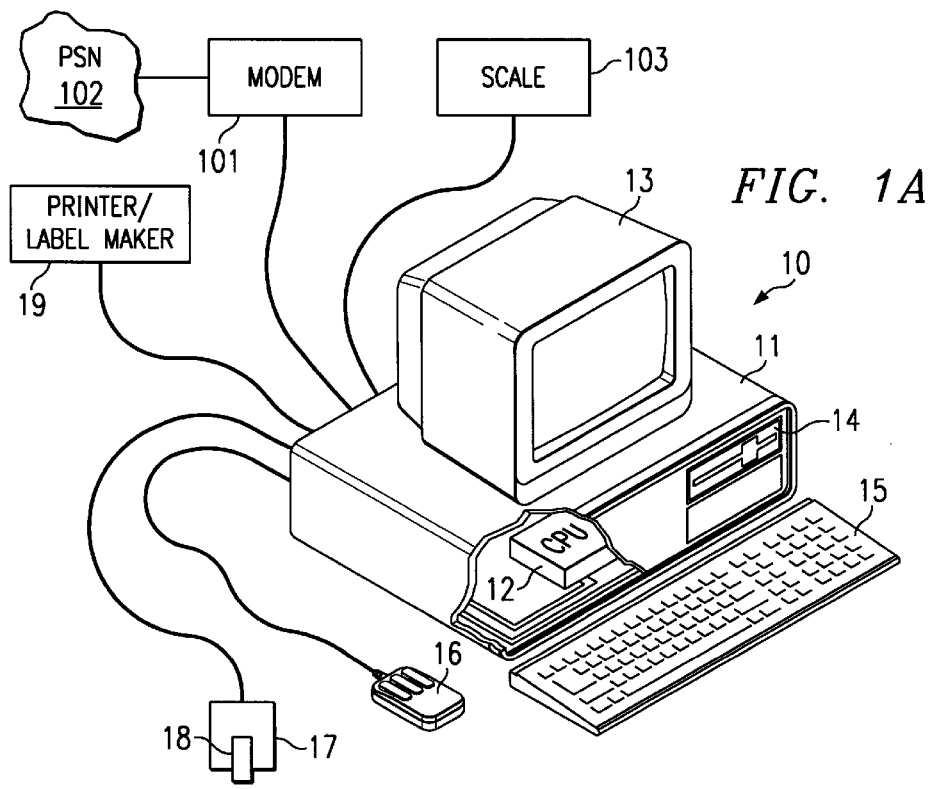
FIG. 1A illustrates a processor-based system for implementation of the present invention.
Figure 1B:
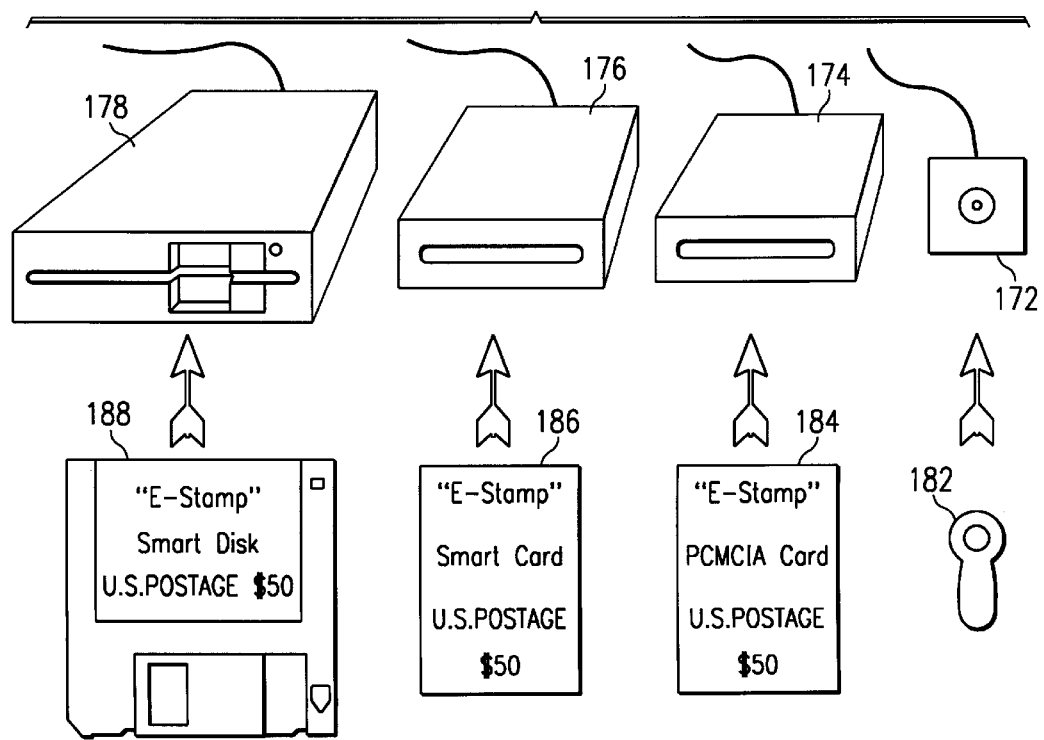
FIG. 1B illustrates several embodiments of the postage storage device.

Referring to FIG. 1, there is illustrated a processor-based system 10 utilized for implementing the present invention, specifically the aforementioned E-STAMP and E-STAMP MAKER programs. System 10 includes chassis 11 enclosing processor ("CPU") 12 and disk drive 14. Coupled to CPU 12 is display 13, keyboard 15 and mouse 16. Furthermore, system 10 is adapted for coupling with a postage storage device 18, such as the preferred embodiment touch memory utility ("TMU") button 182 illustrated in FIG. 1B. Postage storage device 18 is coupled to the processor-based system 10 through a postage storage device receptor 17.

The postage storage device may be any memory device having some residual data capability, where that memory device can provide sufficient security measures to efficiently limit access to the memory of the device to authorized users. For example, since algorithms can be used to control access to the memory device a standard "diskette" can be used if desired.

The preferred embodiment, TMU button 182 incorporates a small disk having a memory. TMU button 182 is a small, light-weight, portable, essentially non-breakable device available from Dallas Semiconductor, Dallas, Tex. A TMU button 182 may be coupled to processor-based system 10 through button holder 172. In a preferred embodiment of the present invention a batch of TMU buttons will be manufactured with specifically designated serial numbers for use solely with the present invention. However, disposable TMU buttons 182, preloaded in various denominations, could also be sold either over the counter or in existing stamp machines at post office locations. The post office may also select to sell pre-loaded TMUs, on which the customer pays a deposit, that can be exchanged for another TMU or returned for the deposit whenever button 182 is depleted of postage. All postal locations may sell pre-loaded TMUs or the post office may elect to designate particular post office locations for selling TMUs.

An advantage of the preferred embodiment (the TMU button 182) is that a TMU button 182 is small enough and light enough that several may be carried in one hand. Furthermore, the TMU button 182 is sufficiently durable to be sent through interoffice mail.

Additional alternative embodiments of the postage storage device 18 are illustrated in FIG. 1B. One alternative postage storage device 18 is a smart disk 188 incorporating its own electronic modules capable of read/write operations. One embodiment of such a smart disk 188, Smart Disk™, can be obtained from Smart Disk Security Corporation, Naples, Fla. The Smart Disk™ looks like a floppy disk and fits into a typical PC's floppy disk drive such as disk drive 178, connected either externally or internally to processor-based system 10; however, Smart Disk™ has its own microprocessor that provides secure, password protected storage. One advantage of the Smart Disk™ is that it can operate in a standard PC disk drive without modification to the disk drive or PC. Smart Disk™ provides security for stored postage with an encrypted password and the encryption algorithm.

Another type of postage storage device 18 is a smart card 186, a plastic card embedded with a microchip. The microchip contain mathematical formulas that encrypt computer data to secure access to that data (i.e., postage) and verify a user's identity before allowing access to the data. One drawback in the currently available smart cards 186 is that they require a magnetic card processor 176 hooked to the processor-based system 10.

Still another type of postage storage device 18 is a PCMCIA card 184. PCMCIA cards are currently used on notebook computers for modular storage and communication. Both external and internal add-on hardware 174 (i.e., card slots) are available for PCs.

The postal storage device 18 may be used on a variety of processor-based systems 10. Processor-based systems 10 may be located in an individual's home, at any business location, or may even be present in a post office lobby for after hour usage. In a preferred embodiment, system 10 is a PC. In an alternative embodiment, system 10 could be part of a main-frame computer or system 10 could be part of a network system.

Figure 2:
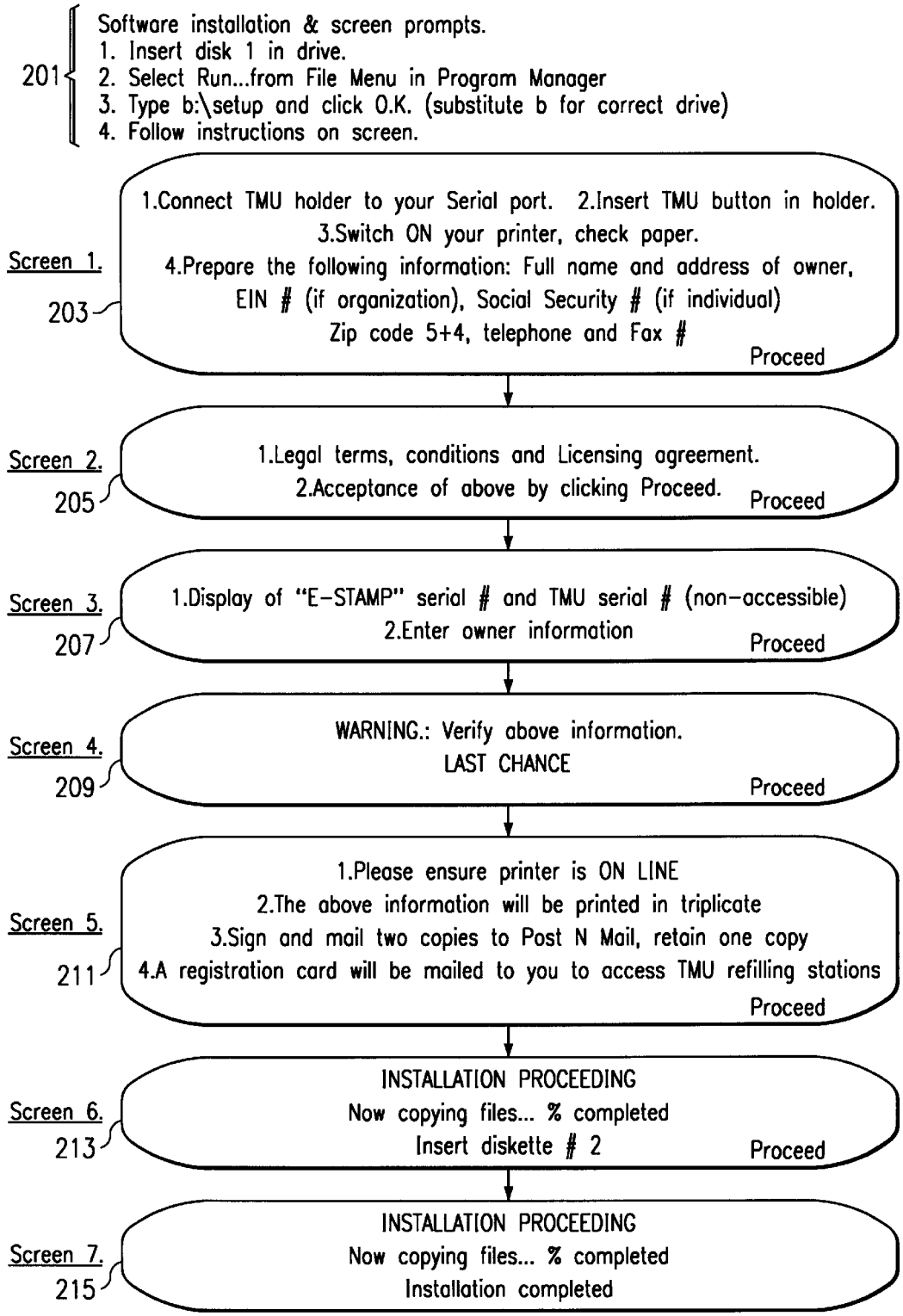
FIG. 2 illustrates an embodiment of user instructions and screen prompts utilized by the present invention to interface with a user when installing the program on the processor-based system for implementation of the present invention.

Typically, a user will buy a postage storage device 18, containing a small quantity of postage, with a copy of the E-STAMP program. The user will then install the E-STAMP program on the user's processor-based system 10. FIG. 2 illustrates one embodiment of user instructions and screen prompts to be followed by the user during the installation of the E-STAMP program. The instructions and screen prompts illustrated in FIG. 2 reflect the installation of the E-STAMP program in a "windows" operating environment on a PC equipped with a TMU button 182 and TMU 172 holder. Of course, other means could be employed for implementing the present invention within a processor-based system 10.

The user installation instructions 201 inform the user how to pull up the E-STAMP installation program. Once the installation program is initiated, screen 203 will appear. Screen 203 instructs the user to connect the TMU holder 172 to a serial port and to insert the TMU button 182 into the holder 172. The user is then instructed to turn on a printer 19 that has been coupled to the processor-based system 10 and check to see that the printer 19 is supplied with paper. Screen 203 further requests that the user prepare the following information: the user's full name and address, an identification number for the user (i.e., an employer identification number (EIN#), if the user is a business or organization; or a social security number (SS#), if the user is an individual), the user's zip code, the user's telephone number and the user's fax number. The next screen, screen 205 displays the Post N Mail License Agreement with its legal terms and conditions. Acceptance of the terms and conditions set out in the license agreement is indicated when the user continues with the installation program.

Next, screen 207 will appear and display the E-STAMP serial number and TMU serial number. At this time the user-specific information requested in screen 203 should be entered into the E-STAMP program. Once the user has entered the user-specific information, screen 209 will appear warning the user to carefully verify the correctness of the entered information.

After verifying the information added into the E-STAMP program, screen 211 will remind the user to ensure that a coupled printer 19 is on line. The user information entered into the E-STAMP program will then be incorporated into a user registration form, one embodiment of which is illustrated in FIG. 3. The E-STAMP registration form will be printed in triplicate. The user is instructed to sign and mail two copies of the registration form to the creator of the E-STAMP program, Post N Mail, Inc. and to retain one copy of the registration form. Screen 211 also informs the user that a registration card will be mailed to the user in order that the user may access TMU refilling stations.

The E-STAMP installation program continues with screen 213, which describes the progress being made in installing the E-STAMP program, and screen 215, which informs the user when the E-STAMP program installation has been completed.

Referring to FIG. 3, there is illustrated a preferred embodiment of the E-STAMP registration form. The registration form includes information such as the TMU button serial number 31, the E-STAMP serial number 32, the date and time that the E-STAMP program was installed 33, and user-specific information 35 (e.g., name, address, telephone and fax numbers, and identification number), and a copy of the Post N Mail License Agreement 38 having an identified location for the user to sign. A preferred embodiment of the E-STAMP registration form will also contain all of the information needed to specifically identify the TMU button, E-STAMP program, and registered user in an encrypted format 37. The encrypted information 37 will be in a machine-readable graphical security interface such as a standard bar code.

The standard bar code contains white and dark areas in the form of bars that can be read by a laser scanner. The laser scanner illuminates the white and dark areas with a light of a certain frequency. The light is reflected back to the laser scanner in such a way as to indicate the pattern of white and black areas within the bar code. Since white areas reflect much more light than dark areas do, a perpendicular scan of the bar code will allow the scanner to translate the reflected light into the coded information. More than 20 linear bar code languages have been developed, each with its own specifications for how many bars and spaces make up a character, how characters are to be arranged, whether the characters can be letters as well as numbers, and so forth. The most widely-used bar code is the Universal Product Code (UPC) seen on everyday grocery items. The standard bar code currently used by the post office is POSTNET ZIP+4 described in Postal Service Publication number 67.

More sophisticated graphical security interfaces have been developed over the last decade, such as Intermec Corporations' Code 49 and Laserlight System Inc.'s Code 16K. A major advantage of these more sophisticated graphical security interfaces is that they contain an error-correction formula which can often recover the entire message even if parts of the code have been torn or damaged.

A preferred embodiment of encrypted information 37 is a graphical security interface developed by Symbol Technologies of Bohemia, N.Y. and is called PDF417, a-portable data file. PDF417 is a graphical security interface constructed from data units called "words," each of which is 17 modules long. Bars are made from filling in up to six consecutive modules and each unit has four separate bars and four spaces. In essence, PDF417 can stack the equivalent of up to 90 one-dimensional bar codes, each just three hundredths of an inch high. Thus, the PDF417 symbology is more complicated to produce and scan than is the typical one-dimensional bar code and allows for a denser coding of information. Because the PDF417 symbology specification includes sophisticated protocols for error-correction, the actual density of information is highly variable, but can be ten times the amount of information found in U.S.P.S. PostNet bar code, per square inch. PDF417 is available from Symbol Technologies, Inc., 116 Wilbur Place, Bohemia, N.Y. 11716 and the operation of the PDF417 is detailed in PDF Primer obtained from them and is hereby incorporated herein by reference.

When Post N Mail, Inc. receives the signed Post N Mail License Agreement from the user, the encrypted information 37 can be scanned with a laser scanner so that the information contained therein can be automatically transferred to a registered user's database. When the encrypted information 37 has been transferred to the registered user's database, a registration card containing a Post N Mail (PNM) serial number will be printed and mailed to the registered user.

The user may then take that registration card with the user's TMU button 182, or other postage storage device 18, to the post office to-be registered with the post office. Until the TMU button 182 has been registered with the post office, the E-STAMP MAKER program will not recognize TMU button 182 as being an authorized postage storage device 18.

To register a TMU button 182, or other postage storage device 18, a postal worker must enter the information on the PNM registration card into the E-STAMP MAKER program. Such information will include the PNM serial number, EIN# number or SS#, TMU button serial number, and the address and telephone number of the registered user. Once all of this information has been entered into the system, the E-STAMP MAKER program will then recognize TMU button 182 and allow a postal worker to replenish the amount of postage stored within button 182 at the request of the user in a manner to be discussed below.

System 10 may be utilized at a customer site for permitting a user to retrieve postage stored within postage storage device 18, via the E-STAMP program, for subsequent printing as a postage meter stamp onto a piece of mail through printer 19, coupled to system 10. The utilization of the E-STAMP program by a customer will be further described below.

Alternatively, a pair of systems 10 may be linked together through Public Switched Network ("PSN") 102 via modem 101 or directly through digital telecommunications trunks (not shown). Processor based systems 10 located at different U.S. Post Offices may be linked via PSN 102 in a conventional well known manner (such as through modem 101) so that information may be shared between the various post offices. Generally, a copy of the E-STAMP MAKER program will be stored within at least one processor-based system at selected U.S. Post Office locations. PSN linkage of processor-based systems 10 by the post office and the customer, or user, will allow the sharing of information between the various post offices and will allow a customer to call a number (an authorized post office number) and have the post office transfer the required amount of postage to a postage storage device 18 button installed at a customer site by modem.

Referring to FIG. 4A, there is illustrated a preferred embodiment of a display screen shown on display 13 to a U.S. Post Office employee when accessing the present invention on system 10. Of course, the particular display aspects illustrated in FIG. 4A may be modified in any one of numerous ways. Also, in a preferred embodiment of the present invention, processor-based system 10 will provide for input from a user via keyboard 15 and mouse 16. However, other various forms of input available to processor-based systems may be utilized, such as a light pen or a touch-sensitive screen (both not shown).

In the top portion of display screen 40, there is indicated an E-STAMP MAKER serial number, in this example "77014-9998-44." This serial number may include the zip code of the post office location, or may be selected at random. This serial number may also include a designation of a particular system 10 or a designation of the postal employee performing the transaction.

In the upper left-hand corner of display screen 40 is illustrated a TMU serial number, in this example "2 128 176 32 0 0 0 175." This serial number represents eight bytes of information stored within TMU button 182, each byte may represent any-number from 0 to 255. A TMU serial number is specifically assigned to and will identify a specific TMU button 182. Thus, display screen 40 indicates that the postal employee has coupled an authorized TMU button 182 to a processor-based system 10 which incorporates the E-STAMP MAKER program.

Typically, the first two numerals (bytes) within the TMU serial number are assigned by the button (or memory) manufacturer. The third byte is selected by the U.S. Postal System and identifies TMU buttons 182 specifically designed for the E-STAMP MAKER program, excluding other TMU buttons 182 not designed for the E-STAMP MAKER program, such as disposable buttons, and assisting in the exclusion of any other means for accessing the E-STAMP MAKER program. As a result, the present invention may be designed so that only authorized TMU buttons 182 may access the E-STAMP MAKER program for replenishment of postage as will be discussed below.

The remainder of the TMU serial number is basically the sequential serial number of that particular TMU button 182 in particular.

As the E-STAMP MAKER program reads the information stored within TMU button 182, the TMU serial number and the information in blocks 401 and 402 are displayed on display 13. The "TMU Verification" information in block 401 shows the date and post office location where the last addition of postage was electronically stored within button 182. As shown within box 401 of FIG. 4A, coupled TMU button 182 currently contains a postage balance of $6.72, which is most likely a portion of the postage that was input into button 182 at 3:18 p.m. on Oct. 30, 1993, at the post office having an ID number of "77090-2765-65." It may be observed that this serial number is different from the E-STAMP MAKER serial number shown at the upper right-hand corner of display screen 40, indicating that these numbers represent two different post office locations, and that button 182 was formerly coupled to a processor-based system 10 at post office "77090-2765-65" but is currently coupled to a processor-based system 10 residing at post office "77014-9998-44".

Box 401 also shows the expiration date of button 182, the user's PNM registration number, the user's E-STAMP serial number, and a strike and dollar counter check as will be described in more detail below.

Box 402 is also displayed on screen 10 and itemizes the quantity of postage of designated values that has been used and subtracted from the postage stored in button 182. For example, box 401 of FIG. 4A shows that $500.00 worth of postage was initially added to button 182 and that $6.72 worth of postage remains in button 182. This means that $493.28 worth of postage has been deducted from button 182. Box 402 of FIG. 4A shows that postage valued from $0.01 to $0.29 was subtracted from the amount of stored postage 991 times, that postage valued from $0.30–$0.40 was subtracted 166 times, that postage valued from $0.41–$0.45 was subtracted 122 times, that postage valued at $1.00–$1.99 was subtracted 14 times and that postage valued at more than $3.00 was subtracted 16 times.

In a manner to be discussed in detail below with respect to FIG. 5, the first password (i.e., BCLINTON) shown in box 403 of FIG. 4A, is entered into the E-STAMP MAKER software. That password will be used to generate other passwords as described below and checked against the information stored in button 182. If the post office requests it, an extra password can be included to access and start the E-STAMP MAKER program. When the correct password for button 182 is entered into E-STAMP MAKER (i.e., BClinton), a string of numerals are generated as shown in block 404. In a preferred embodiment of the present invention, the first several numerals within block 404 represent the current time and date. A second string of numerals represent the E-STAMP MAKER serial number and the post office identification number. The remainder of the 45 bytes are generated randomly by the E-STAMP MAKER program. This generation of random numbers is detailed below.

Thereafter, a second password is generated from the numbers within block 404 through the application of an algorithm, an example of a second password is illustrated in block 405. These numbers are used as a second password to assist in the random generation of numerals within block 406.

In a preferred embodiment of the present invention, fourteen of the 45 bytes or numerals within block 406 represent a button usage analysis (i.e., how much of what value of postage has been used); three numerals (bytes) represent the number of strikes (or uses) that have been made and subtracted from a starting point of 2,500,000; and four numerals (bytes) represent the dollar value of postage used and subtracted from a starting point of $2,500,000. The remainder of the numerals are generated randomly by the E-STAMP MAKER program.

Thereafter, another algorithm utilizes the numerals generated within block 406 to derive the third password displayed within block 407. If all is correct, the cursor will then stop within block 408 so that the postal employee may enter a desired amount of postage in U.S. dollars as requested by the user owning TMU button 182 currently coupled to the E-STAMP MAKER program. In a preferred embodiment of the present invention, four bytes represent the amount of postage entered by the postal worker, ten bytes represent user-specific information, five bytes represent the user's zip code, three bytes represent the original postage amount, three bytes represent the number of strikes (or times that the postal storage device has been accessed), four bytes represent the accumulated value of postage taken from the postage storage device, and three bytes represent the expiration date of button 182. Button 182 may be programmed to expire at any time desired by the post office. The post office may desire that postage storage devices 18 expire every six months in order to maintain a valid registration with updated information.

None of the numbers described above, or the passwords generated therefrom, are displayed on the screen. However, E-STAMP MAKER utilizes information from button 182 to generate numerals in blocks 406 and 408 to generate the usage analysis log illustrated in block 402 and to perform a counters check illustrated in block 401. The counters check adds the number of strikes subtracted from 2,500,000 (see block 406; descending strike counter) to the number of strikes made (see block 408; ascending strike counter). If these numbers are accurate, their sum should equal 2,500,000. A similar dollar counter check is also performed. The TMU button 182 is initialized to recognize 2,500,000 strikes and $2,500,000 worth of postage. Whenever a user has used 2,500,000 strikes or used $2,500,000 worth of postage, the postage storage device must be returned to the post office, or exchanged for a new one.

As shown in block 408, the user has desired to add $500.00 worth of postage to TMU button 182. This amount has been entered by the employee. Subsequent to entering the $500.00 amount, the postal employee will press button 409, and then press button 410 to "write" the $500.00 amount into TMU button 182 coupled to system 10.

Alternatively, a user may maintain an account with the post office or a credit card account which will be automatically charged for postal charges printed using TMU button 182. In this situation, a set money value will not be entered into TMU button 182, but rather an authorization to debit a particular account will be entered into TMU button 182.

Immediately thereafter, display screen 42, illustrated in FIG. 4B, is shown to the postal employee. Display screen 42 is similar to display screen 40 except for the new information within block 411 which now shows that TMU button 182 contains $506.72 worth of postage, which was updated at 10:45 a.m. on Dec. 15, 1993 by the E-STAMP MAKER program located at post office location "77014-9998-44." Note that in this embodiment the postage original (block 411) and usage analysis log (block 412) are re-zeroed whenever new postage is added to TMU button 182.

Figure 5:
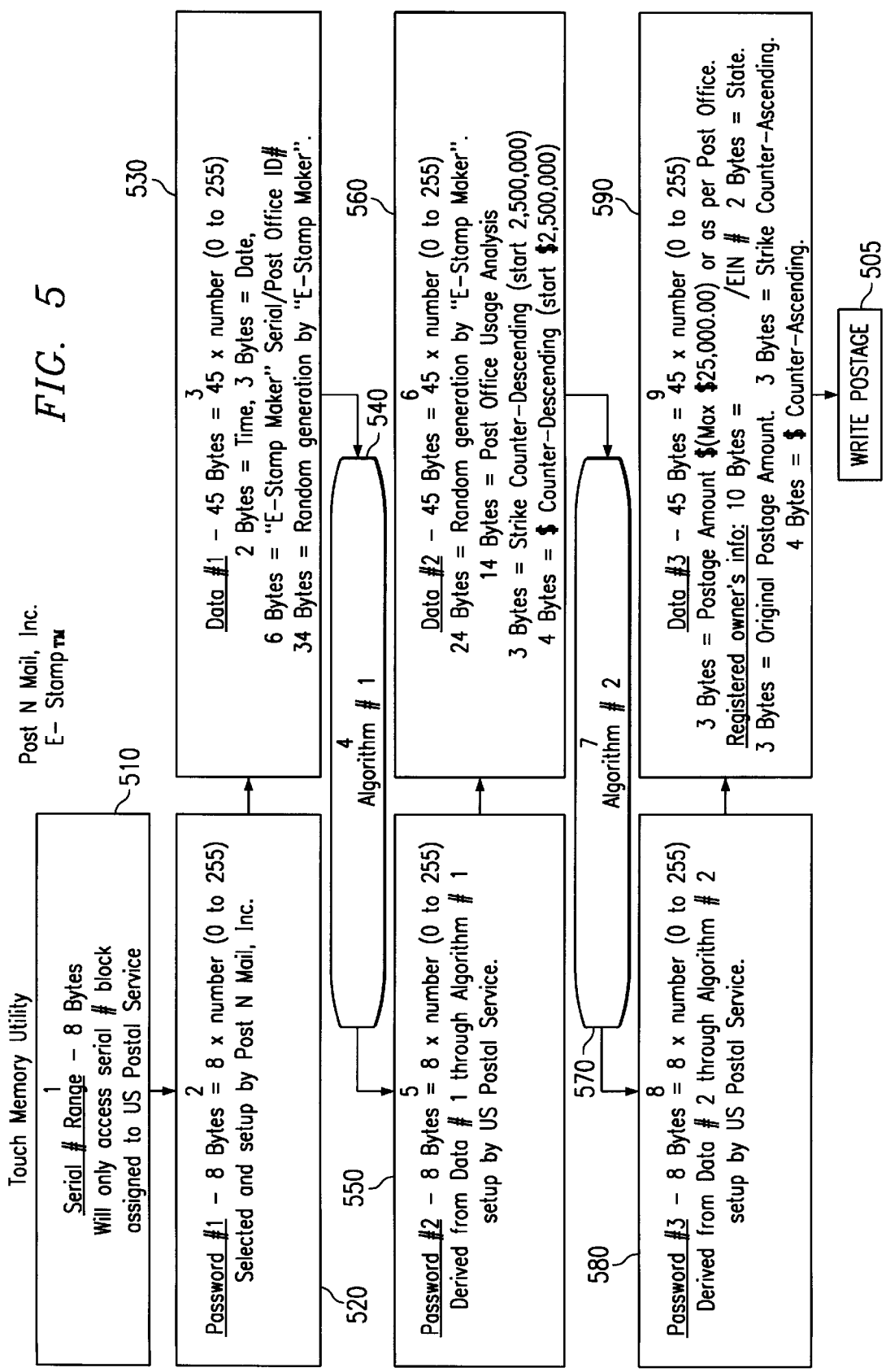
FIG. 5 illustrates a flow diagram of the replenishing process.

Referring next to FIG. 5, there is illustrated a flow diagram of the aforementioned method of providing security within the present invention. First, in block 510, the TMU serial number is accessed by the security program within the present invention. If the TMU serial number is not one specifically assigned to the U.S. Postal Service, the process will not proceed to step 520. In step 520, the program will write a password provided by the creator of the program. Thereafter, at step 530, the aforementioned data is produced and displayed within block 404. The random numerals will be produced as a function of the entered password.

Thereafter, in step 540, a first algorithm selected by the U.S. Postal Service will operate on the data within block 404 to produce a second password (step 550). This second password, displayed within block 405, is used within step 560 to generate a second set of data (the numerals displayed within block 406). A second algorithm within step 570, utilizes the second set of data to produce a third password (step 580). Once the above is written on the TMU button 182, the post office employee will be able to store postage to TMU button 182 by adding the desired amount within block 408 (step 590). Thereafter at step 505, write button 410 is "depressed" to thereby store postage within TMU button 182.

Referring next to FIG. 6, there is illustrated the algorithm used within the present invention, and described with respect to FIG. 5. Note that the TMU serial number may be incorporated into the algorithm(s) to make each TMU button unique. For a given 8-byte password, "p1" represents the first byte of that password. For a given 45-byte data area, "d1" represents the first byte of that data. The "mod operator" stands for the modulus, or remainder, of a division.

Once the required amount of postage has been transferred to the TMU button 182 the user may then physically carry the button back to the user's business location and couple TMU button 182 to a processor-based system 10 through button holder 172. Upon invocation of the E-STAMP program by the customer, the customer's processor-based system 10 can access the postal amount stored in TMU button 182 and down-load portions of the stored postage to the E-STAMP program to be used for printing postage meter stamps on pieces of mail.

Figure 8:
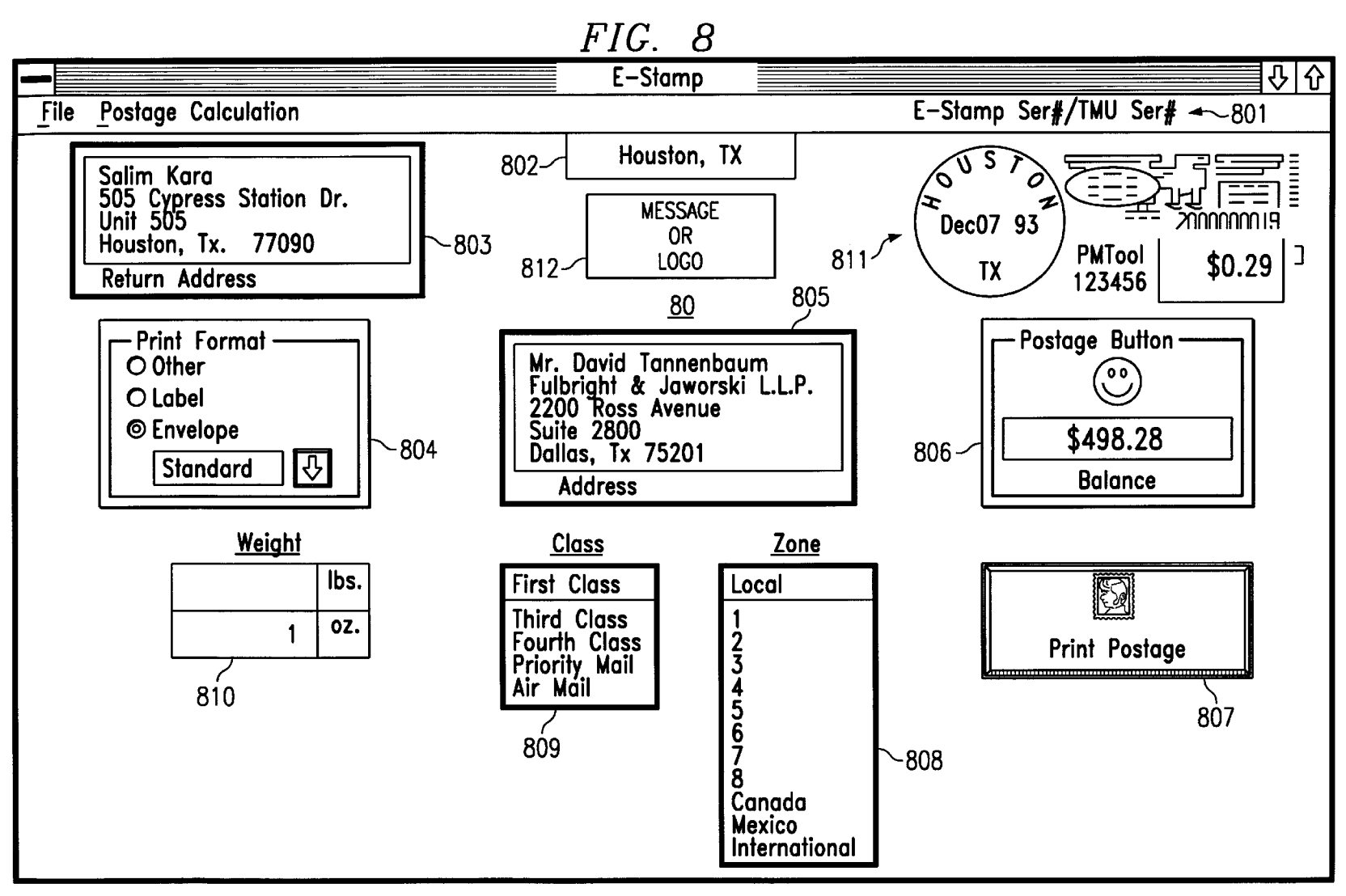

Referring next to FIG. 7, there is illustrated a flow diagram of the process employed within processor-based system 10 configured for allowing a user to print a postage meter stamp. As previously discussed, the E-STAMP program may be a stand alone program, or it may be associated and coupled with a word processor program. Therefore, the E-STAMP program may be started directly (step 701) or through a word processor program also residing on the processor-based system 10 (step 702). Thereafter, at step 703, the E-STAMP program shows display 80, illustrated and described with respect to FIG. 8, to the user.

Next, in step 704, as shown in FIG. 7, the E-STAMP program verifies the TMU serial number associated with TMU button 182 coupled to processor-based system 10. If TMU button 182 has not been inserted within its holder 172, at step 705, a message is flashed to the user to insert TMU button 182. If the wrong TMU button, or a TMU button not programmed for use with the E-STAMP program, has been inserted and coupled to system 10, a warning is flashed to the user to insert an authorized, or valid, TMU button 182 as illustrated in box 706. The process of TMU verification represented by box 704 includes several steps as follows:

Step 1—Serial number is verified.

Step 2—E-STAMP will match its Password 1 (BCLINTON) with the TMU's Password 1. If ok, Step 3—E-STAMP will read information in Data 1 (block 530) and process it through algorithm 1.

Step 4—If the results of step 3 match Password 2, E-STAMP will proceed to Data 2 (block 560).

Step 5—E-STAMP will read information in Data 2 and process it through algorithm 2.

Step 6—If the results of step 5 match Password 3, E-STAMP will then be able to access Data 3 which contains postage amount and proceed to step 707.

If a valid TMU button is coupled to system 10, at step 707, the information within TMU button 182 is read and the information is verified, for example the ascending and descending counters are added together for verification and the expiry data is verified if the postal balance is greater than $2.01. In addition, the zip code, E-STAMP serial number and user identification number are verified. If all of the information checks out the TMU button's serial number is displayed in conjunction with the E-STAMP serial number in the top right corner of screen 80 (see 801). The remaining postage balance residing within TMU button 182, is displayed within block 806.

Next, at step 708, return address box 803 is completed automatically or manually. The address within 803 may be automatically entered from the adjoining word processor program, the address may be selected from a drop-down box (not shown), or the address may be manually input. Any entered address may be saved within the E-STAMP program. Additionally, if a return address is not desired, it may be omitted.

Thereafter, in step 709, the contents of address box 805 are entered in a manner similar to the contents of return address 803.

Next, at step 710, the user may select the print format by the use of box 804. As illustrated, the postage meter stamp may be printed on a label through printer/label maker 19, or a choice may be made to print the postage meter stamp on an envelope inserted within printer 19, which may be chosen to be a standard size or a nonstandard size as selected by the user. Note that if the postage meter stamp is to be printed on a label, it may be desired that the return address within 803 and the address within box 805 not be printed.

Figure 9:
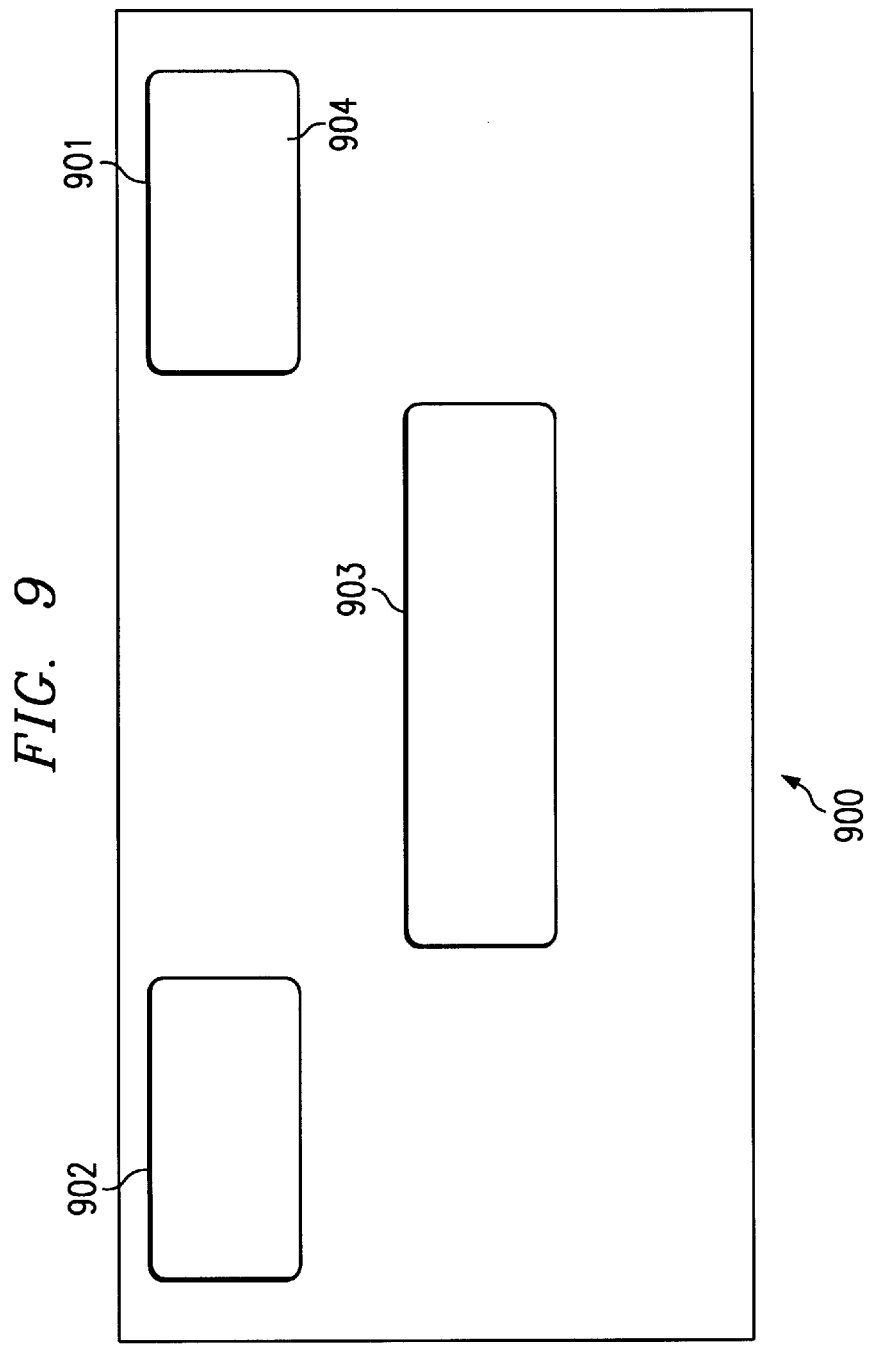
FIG. 9 illustrates an envelope used to display the postage meter stamp printed on a letter.

Alternatively, the postage meter stamp and the addresses within boxes 803 and 805 may all be printed on a flyer, a pamphlet, a postcard or sheet of paper. Whenever the meter stamp is printed on a letter, along with the addresses in boxes 803 and 805, that letter may be folded so that the meter stamp will show through an opening or window 901, in the top right hand corner of a specially designed envelope 900 illustrated in FIG. 9. Envelope 900 may be a standard or non-standard size with any number of windows as designed by the user. Typically, envelope 900 will have a first window 901 in the top right hand corner for the printed postage meter stamp to show through. Envelope 900 may also have other windows for the addressee's name and address (903) and for a return address (902) to show through. Envelop 900 may have glassine paper, or other transparent covering material 904, covering the described windows such that the postage meter stamp and other imprinted information is protected from inadvertent detachment and adverse conditions (such as inclement weather).

Thereafter, in step 711, the user enters the weight of the package or letter associated with the postage meter stamp in box 810. This weight may be entered manually, or automatically through the use of scale 103 coupled to processor-based system 10 in a manner well known in the art. In step 712, the user selects the class of mail from the choices shown in box 809.

At step 713, the user may select whether or not to print selected data within the meter stamp using a graphical security interface (see previous discussion of graphical security interfaces). The graphical security interface may be a standard POSTNET ZIP+4 Coding as provided in Postal Service Publication 67 and incorporated herein by reference. However, a preferred embodiment will print the postage meter stamp utilizing Symbol's Portable Data File code (the PDF417 symbology) as described above.

Typically the postal meter stamp may include any combination of the following information: the day, the date, the postage storage device serial number, the E-STAMP serial number, the sender's zip code, the addressee's zip code, the expiration date of the postage storage device, the cumulative values of the strike and dollar counters, PNM registration number, the user's identification number, and the post office identification number. The postage meter stamp may contain this encrypted information incorporated within an insignia or design, or it may appear as a background for the postage amount printed in a visually recognized form.

By printing the postal meter stamp with encrypted information within the stamp, the post office can scan the postal meter stamp to verify that an item of mail has been posted with authorized postage and/or to automatically sort the mail for distribution.

Furthermore, the use of the E-STAMP MAKER program in conjunction with a database program will allow the post office to generate records indicating all E-STAMP authorized postage by post office location (or zip code), post office employee, TMU serial number, etc. This information can be easily compiled to determine post office sales, market forecasts, etc.

Next, at step 714, the user may select a U.S. postal zone or alternatively elect that the particular piece of mail is to be sent to Canada, Mexico or some other international designation as depicted in box 808.

The E-STAMP program will automatically incorporate the aforementioned entered parameters—weight, class, zone—in order to correctly calculate the correct postage to print in conjunction with the meter stamp and to deduct from the postage amount stored within TMU button 182.

Lastly, in step 715, the E-STAMP program utilizes the input/output ports of processor-based system 10 to send to printer/label maker 19, the correct data pertaining to the meter stamp to be printed on an envelope, letter, card or label.

The amount of postage printed on the meter stamp is automatically deducted from the amount stored within TMU button 182. Other information is also automatically updated including the usage record for this particular serial number of TMU button 182 and any other information, such as the addressee, the postage amount, the date, and the original denomination.

Note that during the selection of the various parameters within display 80, the E-STAMP program may be implemented to update the postage amount displayed within meter display 806 as each parameter is chosen on essentially a real-time basis.

Box 802 is provided for the user to insert the location from which the mail is to be sent. The date that the mail is stamped is automatically adjusted every day by the E-STAMP program and will prevent post-dating or pre-dating mail. This information is added within display 811 or may be encrypted within the postage meter stamp. The location may also be utilized by the E-STAMP program to calculate the correct postage.

Message box 812 is provided to allow the user to add a message or greeting (e.g., "Happy Holidays") to be printed next to the meter stamp. This message may be changed at any time by the user, directly or by a "merge" command in conjunction with a word processing or graphics program coupled to the E-STAMP program.

The aforementioned steps may be repeated for a subsequent piece of mail, or the user may decouple TMU button 18 from system 10.

Using the E-STAMP system and method, users like lawyers, accountants, advertising agencies, etc., who bill their clients for postage will be able to keep track of postage expenses on a per client basis.

The aforementioned E-STAMP and E-STAMP MAKER programs have been shown and described with respect to a "windows" operating environment on a PC. Of course, other means could be employed for implementing the present invention within a processor-based system.

Referring to FIG. 10, the process begins at Step 1000 where a button is initially created and given a small token value. The button creation is marked by its entry into an "Initial Fill Button Inventory Database" simultaneously with its inclusion in a shrink-wrapped package of software to be shipped to users of the verification system. Once a given software package, button included, has been obtained by a potential user, he/she must fill out an electronic user registration form whose present embodiment is that of a "Windows" program separate from the main program but included with it on the system installation disks. The registration program must be executed as part of the installation of the system before it can be used to issue postage. The process of the user filling out the form, sending it and the still-unregistered button back for registration to be scanned into the user registration database is represented in Step 1001 and Step 1002. Also included in these steps is the removal of the button from the Initial Fill Button Inventory Database now that it is a valid registered postage dispensing device. In effect, the button, with its unique serial number was moved from one inventory to another. Furthermore, as will be seen in future steps, the user registration database will be used for far more than just normal user registration of a software product.

In Step 1003, the user has received back his/her button, now fully registered and therefore legal to use in postage transactions. The user inserts the secure meter (button) in its interface receptacle and invokes the system control program on the PC. Once a letter has been produced, with a certain amount of postage, this amount of postage is deducted from the amount stored in the portable processor (memory) by way of commands from E-STAMP. The postal indicia with its encrypted form of user information, postage amount, date, strike counter and other information is printed on a label for sticking to an envelope or actually printed on an envelope. At this point, the mail object is entered into the mail system of the Postal Authority in Step 1004A.

In Step 1004B, the article of mail has been gathered and sent to a central processing facility. In Step 1005, the article of mail is scanned. The scan process first decodes the postal indicia using bar code scanning technology coupled with industrial automation toward the goal of validation of the pre-paid rights to send the article of mail. The system, in Step 1006, uses a series of criteria and checks to accomplish this. Examples of criteria include, (but are not limited to): 1) Just the fact that the indicia, which was encrypted in the secure environment of the portable postage dispensing device, can be decrypted gives a basic comfort level of validation; 2) Check against the central user database for validation of expiration date, expected balance of meter-as of now and special flags for lost or stolen portable postage dispensers giving the capability to invalidate them much in the same way lost or stolen credit cards can be invalidated because of their validation against a central database. This check against the central user database for validation may utilize data contained in the postal indicia as an address location in the database for the storage or retrieval of information pertaining to the authenticity of the postal indicia.

If the article of mail passes, in Step 1007A, the mail is routed to its normal destination. However, if the article of mail does not pass one of the tests, it is rejected to Step 1007B where an entry is written in an Anomaly database 1007C of items to be investigated.

The refill, Step 1008, happens asynchronously to the rest of the steps, but is included, nevertheless, because of its contribution to the overall process loop. This is performed when a user has used most of the pre-paid credit on his/her meter (portable memory) and must return the memory to an authorized refill station, such as the Postal Authority. The preferred embodiments may include simply a host processor-based system used by one authorized agent to serve walk-up clientele or an automated process whereby postage processor buttons are refill-processed in batches with little human interaction. In either case, the user provides his/her portable processor (memory) to the authorized agent, along with prepayment in the form of check, credit card or private account. The portable processor is credited with the prepayment amount using a PC which is executing an embodiment of the software system and empowered to accomplish this in a secured and authorized environment. Once the portable processor has been credited, it is returned to the user, who can then continue to freely use the system to issue postage until the next time the portable processor must be refilled with pre-paid credits.

The other important contribution of the system is its updating of the central user database with information on renewed expiration date, user pre-paid balance, refilling station identification, etc. This information is invaluable in the validation Step 1006.

As discussed above, the process loop gives the benefits of accounting and auditability of pre-paid electronic postage to the adopting Postal Authority.

While the invention has been shown to work in conjunction with a postal indicia system, it should be understood that the indicia is simply a printed form of a data packet produced by the cooperative effort of the PC and the portable memory. The data packet contains information that can be used for look up purposes in the data base. Thus, the data packet can serve to authenticate any data stream coming from the PC or can be to authenticate itself, thereby granting a user certain privileges, based upon the authentication. For example, the data packet could be associated with airline tickets, either in printed form or in electronic form. In either event, the data packet associated with the document to be checked is authenticated to prove the authenticity of the accompanying data. As noted, the "other" data can be printed (the data packet would then be printed and scanned into the system) or the "other" data could be electronic (the data packet could then be electronic and read directly).

Although the present invention and its advantages have been described in detail, it should be understood that various changes, substitutions and alterations can be made herein without departing from the spirit and scope of the invention as defined by the appended claims.

What is claimed is:

1. A method for encrypting user-specific information for registering a software license agreement, said method comprising the steps of:

installing a software program onto a processor-based system;

requesting a software user to input user specific information into said system in response to a prompt;

encrypting said user-specific information in a machine-readable format, said machine-readable format being specifically adapted for use by a machine; and printing said encrypted information on a tangible media.

2. The method as recited in claim 1 wherein said user-specific information is encrypted in a two-dimensional symbology.

3. The method as recited in claim 1 further comprising the step of sending said encrypted information to an owner of rights in said software program.

4. The method as recited in claim 1 further comprising the step of scanning said encrypted information into a database of registered software users.

5. A system for registration of a product, said system comprising:

means for inputting user information into an electronic user registration form;

means for identifying other information available at a first processor-based system to be associated with said electronic user registration form;

means for outputting a tangible user registration form including at least a portion of said user information and said other information, wherein said tangible user registration form includes a machine-readable portion having information selected from the group consisting of said user information and said other information, wherein said machine-readable portion is not directly readable by a human;

means for reading information included within said tangible user registration form; and means for including at least a portion of said information read from said tangible user registration form in a registered user database.

6. The system of claim 5, wherein said registration system registers a software product, wherein said registration system operates separately from said software product to be registered.

7. The system of claim 6, wherein said registration system precludes installation of said software product on said first processor-based system until said tangible user registration form is generated.

8. The system of claim 5, further comprising: means for encoding at least a portion of said tangible user registration form.

9. The system of claim 5, wherein said machine-readable portion is a two dimensional bar code.

10. The system of claim 5, wherein said tangible user registration form also includes human readable information, wherein said human readable information is directly perceptible to a human.

11. The system of claim 10, wherein said human readable information includes a product license agreement and said tangible user registration form includes a space for a user to acknowledge consent to said agreement.

12. The system of claim 5, wherein said other information includes information selected from the group consisting of:

a serial number of said product;

a serial number of a portable device;

a date; and a time.

13. The system of claim 12, wherein said portable device is adapted for use with said product to be registered, and wherein said portable device serial number is utilized by said second system to add said portable device to a central database.

14. The system of claim 13, further comprising: means for authenticating said portable device in temporal proximity to said reading means reading said information included within said tangible user registration form.

15. The system of claim 14, wherein said tangible user registration form and said portable device are transmitted together to an operator of a second processor-based system.

16. The system of claim 12, further comprising: means for outputting a registration card as evidence of registering of said product.

17. The system of claim 16, wherein said registration card contains information to activation of said portable device.

18. The system of claim 17, wherein said activation of said portable device is for a limited time and said portable device must be periodically reactivated.

19. The system of claim 18, wherein reactivation of said portable device requires reference to said central database.

20. The system of claim 17, wherein said portable device is adapted for storage of postage credit, and wherein said product is a postal indicia generation computer program.

21. A method for registration of computer software, said method comprising the steps of:

accepting user information into an electronic user registration algorithm operating at least in part on a first computer;

identifying other information available at said first computer;

outputting registration information including at least a portion of said user information and said other information, said registration information including at least a portion of said user information in a machine-readable format, wherein said machine-readable format is specifically adapted for use by a machine;

inputting at least a portion of said registration information into a second system; and including at least a portion of said information input into said second system in a registered user database.

22. The method of claim 21, wherein said accepting, identifying and outputting steps of said computer software registration method must be completed prior to installation of said computer software on said first computer.

23. The method of claim 21, further comprising the step of:

encrypting at least a portion of said user information included in said registration information.

24. The method of claim 21, wherein said machine-readable format is a two dimensional bar code.

25. The method of claim 21, wherein said registration information includes human readable information which is adapted to be directly understandable to a human.

26. The method of claim 21, wherein said other information includes information selected from the group consisting of:

a serial number of said software program;

a serial number of a portable memory device;

a date; and a time.

27. The method of claim 21, wherein said other information includes unique identification information of a device removably coupled to said first computer, and wherein said unique identification information is utilized by said second system to add said device to a central database.

28. The method of claim 27, further comprising the steps of:

authenticating said device at said second computer.

29. The method of claim 28, further comprising the step of:

transmitting said registration information and said device together to an operator of said second computer.

30. The method of claim 27, further comprising the step of:

outputting confirmation information as evidence of registering said computer software.

31. The method of claim 30, wherein said confirmation information contains information to authorize registration of said device with a third party.

32. The method of claim 31, wherein said device is adapted for storage of postage credit and said third party is a postal authority, and wherein said computer software is a postage related program.

33. The method of claim 27, further comprising the step of:

activating said device for use as a credit value storage device, said activation being set to expire at a predetermined length of time.

34. The method of claim 33, further comprising the step of:

reactivating said device for use as a credit value storage device, said reactivating step including reference to said central database.

35. A set of computer program products each including a computer readable medium having computer program logic recorded thereon for registration of a software program, said computer program product set comprising:

a first computer readable storage medium having a first computer program stored therein, said first computer program including:
means for accepting user information into an electronic user registration algorithm, said user information being input by a user of said first computer program;
means for identifying other information available at said first processor-based system to be included in a printed registration form, said other information including unique information identifying a memory device to be registered to provide secure storage of a monetary equivalent value;
means for outputting said printed registration form including at least a portion of said user information and said other information, said printed registration form including at least a portion of said user information in a machine-readable format, wherein said machine-readable format is not directly readable by human viewing;

a second computer readable storage medium having a second computer program stored therein, said second computer program including:
means for accepting information included within said printed registration form; and
means for integrating at least a portion of said accepted information in a registered user database.

36. The computer program product set of claim 35, wherein said first computer program further comprises:

means for encrypting at least a portion of said printed registration form.

37. The computer program product set of claim 35, wherein said printed registration form also includes human readable information which is adapted to be directly understandable to a human.

38. The computer program product set of claim 35, wherein said memory device is transmittable along with said printed registration form.

39. The computer program product set of claim 38, wherein said second computer program further comprises:

means for outputting a registration acknowledgement as evidence of registering of said software program.

40. The computer program product set of claim 39, wherein said registration acknowledgement is utilized to register said memory device.

41. The computer program product set of claim 40, wherein said monetary equivalent value is a prepaid amount of postage credit, and wherein said software program to be registered is a postage meter program.

42. The computer program product set of claim 35, wherein said unique identification information is utilized to include said memory device in a central database.

* * * * *